United States Patent [19]

Ogushi et al.

[11] Patent Number: 4,937,142
[45] Date of Patent: Jun. 26, 1990

[54] COVERED LEAD WIRE FOR VEHICLES

[75] Inventors: Yoshimi Ogushi, Omiya; Osamu Matsumoto, Ibaraki, both of Japan

[73] Assignee: Shin Etsu Chemical Co., Ltd., Tokyo, Japan

[21] Appl. No.: 341,253

[22] Filed: Apr. 20, 1989

Related U.S. Application Data

[63] Continuation of Ser. No. 104,977, Oct. 6, 1987, abandoned.

[30] Foreign Application Priority Data

Oct. 7, 1986 [JP] Japan ................. 61-238420

[51] Int. Cl.$^5$ .................. B32B 27/20; H01B 7/00
[52] U.S. Cl. .................. 428/391; 174/110 V; 174/110 S; 428/372; 428/389; 428/379
[58] Field of Search ............. 428/375, 379, 372, 389, 428/391; 174/110 V, 110 S, 120 SR

[56] References Cited

U.S. PATENT DOCUMENTS

| | | | |
|---|---|---|---|
| 3,935,369 | 1/1976 | George et al. | 427/120 X |
| 3,945,955 | 3/1976 | Ihde et al. | 521/85 X |
| 4,020,213 | 4/1977 | Berglowe, Jr. et al. | 427/120 X |
| 4,187,159 | 2/1980 | Goswami et al. | 522/117 X |
| 4,209,566 | 6/1980 | Betts et al. | 428/379 X |
| 4,434,251 | 2/1984 | Sasajima et al. | 522/117 X |
| 4,447,569 | 5/1984 | Brecker et al. | 524/109 |
| 4,703,082 | 10/1987 | Godlewski et al. | 525/479 X |

*Primary Examiner*—Lorraine T. Kendell
*Attorney, Agent, or Firm*—Foley & Lardner, Schwartz, Jeffery, Schwaab, Mack, Blumenthal & Evans

[57] ABSTRACT

A covered lead wire for vehicles, comprising a cover comprising a composition containing;
(A) 100 parts by weight of polyvinyl chloride resin;
(B) 0.1 part to 10 parts by weight of polyorganosiloxane;
(C) at least 30 parts by weight of a plasticizer; and
(D) at least 1 part by weight of a stabilizer.

The present covered lead wire can achieve good abrasion resistance and scrape resistance even with reduced thickness of the cover, and can meet the recent demands for the weight-saving and improvement of wiring workability.

10 Claims, No Drawings

COVERED LEAD WIRE FOR VEHICLES

This application is a continuation of application Ser. No. 104,977, filed Oct. 6, 1987, now abandoned.

BACKGROUND OF THE INVENTION

1. Field of the Invention

This invention relates to a covered lead wire for vehicles, and, particularly, to a covered lead wire for vehicles having good lead wire protective properties such as abrasion resistance and scrape resistance, and also capable of making the cover of a lead wire thinner.

2. Description of Prior Art

Covered lead wires for vehicles are slender covered lead wires used in vehicles such as automobiles, two-wheeled or three-wheeled motor vehicles and electric railcars, and they are used, for example, in a wire harness used for transmitting various kinds of information to an instrument panel of vehicles or transmitting various kinds of signals from an operation panel to other portions. The wire harness is required particularly for its cover to be endowed with abrasion resistance, scrape resistance (or scratch resistance), thermal deformation resistance, thermal aging resistance, cold resistance, mechanical properties such as elongation, etc. and electrical properties such as volume resistivity and dielectric breakdown voltage.

Conventionally used for covering lead wires for vehicles are non-rigid polyvinyl chloride resin compositions comprising polyvinyl chloride as its main ingredient, which are produced by extrusion to give a cover of usually 1 to 3 mm in thickness in order to satisfy the above properties required.

Incidentally, there is recently a demand for the cover to have a thickness of as thin as about 0.1 to 0.5 mm for the purpose of weight-saving and improving the wiring workability. In the conventional polyvinyl chloride compositions used for the covered lead wire for vehicles, however, the cover thickness reduced to about 0.1 to 0.5 mm may cause a problem of a considerable lowering of the protective properties such as abrasion resistance and scrape resistance.

To solve such a problem, it may be contemplated to use nylon, PBT, polyester resins, fluorine resins or the like as a substitute resin that can retain such protective properties even with reduced thickness of the cover. These resins, however, have drawbacks such that they have poor processability, have insufficient elongation, have poor wiring workability because of high hardness, or result in high cost. Moreover, they have disadvantages such that the process for producing covered lead wires for vehicles that has been fitted to the polyvinyl chloride resins conventionally used can not be used as they are, so that there can be a problem that a change of production process may result in an increase in the cost of products.

SUMMARY OF THE INVENTION

Accordingly, an object of this invention is to provide a covered lead wire for vehicles that can retain to a high level the protective properties such as abrasion resistance and scrape resistance, even with reduced thickness of the cover, and moreover can use as a cover material the polyvinyl chloride resin composition to which the conventional production process can be applied.

According to this invention, there is provided a covered lead wire for vehicles, having a cover comprising a composition comprising;

(A) 100 parts by weight of polyvinyl chloride resin;
(B) 0.1 part to 10 parts by weight of polyorganosiloxane;
(C) at least 30 parts by weight of a plasticizer; and
(D) at least 1 part by weight of a stabilizer.

The covered lead wire for vehicles of this invention can have good abrasion resistance and scrape resistance even if the cover thickness is reduced to 0.1 to 0.5 mm. Accordingly, it can meet the recent demands for the weight-saving and improvement of wiring workability. In addition, it can be excellent also in other required properties such as thermal deformation resistance, thermal aging resistance, cold resistance and electrical properties, and the polyvinyl chloride resin composition used can be fit for being applied in the production process conventionally used. Thus, it has very great advantages in practical use.

DETAILED DESCRIPTION OF THE INVENTION

There is no particular limitation in the polyvinyl chloride resin of component (A) used in this invention. In general, the higher the polymerization degree of this polyvinyl chloride resin is, the better the abrasion resistance is. Thus, it is desirable to use those having the polymerization degree as high as possible so long as they can be processed. In general, suited for practical use are those having an average polymerization degree in the range of 2,000 to 4,000. A partially cross-linked polyvinyl chloride resin may be also used in an appropriate amount, for example, in an amount of 50 to 100% based on the total weight of the polyvinyl chloride resin, to further improve the abrasion resistance.

There is no particular limitation in the polyorganosiloxane of component (B) used in this invention. Typical examples thereof may include polydimethylsiloxane, polymethylphenylsiloxane, and modified compounds thereof, for example, the compounds modified with a substituent such as an amino group, an acrylic group and a hydroxyl group.

The polyorganosiloxane contributes the improvement of the protective properties, particularly the scrape resistance, of the cover in this invention. Presumably, the polyorganosiloxane, which has not so good compatibility with the polyvinyl chloride resin, moves toward the surface of the cover to give lubricity to the surface, resulting in a lowering of the coefficient of dynamic friction and improving the scrape resistance.

As component (B), particularly preferred is polymethylphenylsiloxane containing 5 to 25 mol % of phenyl groups and having a viscosity (25° C.) of 5,000 to 10,000 cSt, in order to achieve the improvement in the processability of the composition, and the abrasion resistance, scrape resistance and other properties of the resulting cover.

Component (B) may be compounded in an amount of 0.1 part to 10 parts by weight, preferably 0.1 part to 3 parts by weight, based on 100 parts by weight of component (A). In the amount less than 0.1 part by weight, no improvement may not be expected for the protective properties such as scrape resistance, and the amount more than 10 parts by weight may worsen the processability and formability of the composition, resulting in no good products to be obtained.

The plasticizer used as component (C) may include those used in usual non-rigid polyvinyl chloride resins, for example, phthalic acid ester compounds such as dioctyl phthalate (DOP), di-(2-ethylhexyl)phthalate, dibutyl phthalate and diisodecyl phthalate, straight-chain dibasic acid ester compounds such as dioctyl adipate and dioctyl sebacate, phosphoric acid ester compounds such as triphenyl phosphite, trimellitic acid ester compounds, and polyester epoxy compounds. These can be used alone or in combination of two or more ones. This plasticizer may be used in the proportion of 30 parts by weight or more, preferably 50 to 150 parts by weight, based on 100 parts by weight of the above polyvinyl chloride resin. The amount less than 30 parts by weight may cause a lowering of the abrasion resistance and cold resistance of the cover which is a formed product, or undesirably result in poorness of the wiring workability when a wire harness is produced.

Component (D) of this invention, i.e., the stabilizer, may include, for example, metallic soaps such as cadmium salts, barium salts, zinc salts and calcium salts; laurates, maleates or mercaptides of dialkyl tin; organic or inorganic compounds of lead, for example, lead stearate, tribasic lead phosphate, etc.; epoxidized soybean oil; phosphorous acid esters; phenol derivatives; salicylic acid esters; benzotriazole derivatives; polyols; nitrogen-containing compounds; sulfur-containing compounds; keto compounds; organosilicone compounds; boric acid esters; etc. Of the above, in general, particularly preferred are lead stabilizers, taking account of the small surface electrical resistance and volume specific resistance of the resulting formed product. However, in the case where the lead stabilizer cannot be used because of some environmental problem, a barium or zinc stabilizer is preferably used. The stabilizer may be compounded in an amount of 1 part by weight or more, preferably 1 part to 10 parts by weight, based on 100 parts by weight of the polyvinyl chloride resin of component (A). If the stabilizer is in the amount less than 1 part by weight, there can be obtained no effect by its addition.

Besides, an inorganic filler such as calcium carbonate, talc and clay, a processing auxiliary such as polymethyl methacrylate compounds, polyester compounds, etc., a pigment and so forth may be optionally added to the composition used in this invention, so long as the properties required for the covered lead wire for vehicles may not be impaired.

The lead wire used in the covered lead wire for vehicles of this invention may include a lead wire of 0.5 to 4 mm in diameter, made of copper or the like.

The covered lead wire for vehicles of this invention can be produced by extruding the above composition together with a lead wire to effect cover forming. The cover may have a thickness in the range of 0.1 to 2 mm. In particular, it is a feature of this invention that the abrasion resistance and scrape resistance can be retained to a high level even if the thickness is reduced to about 0.1 to 0.5 mm.

EXAMPLES

This invention will be described below in greater detail by Examples, but by no means limited to these. Herein, "part(s)" refers to "part(s) by weight".

EXAMPLES 1 to 5, COMPARATIVE EXAMPLES 1 to 5

Prepared were mixtures having the composition as shown in Table 1.

Each of the mixtures according to the respective Examples and Comparative Examples was blended with heating up to 120° C., and taken out after cooling to obtain a powdery compound. This powdery compound was extruded with use of a biaxial extruder and formed into pellets according to hot cutting to obtain cylindrical pellet compounds of about 3 mm in diameter and 3 mm in length each. Using these pellet compounds, cover forming was carried out by extruding them simultaneously with a copper wire of 0.9 mm in outer diameter with use of a monoaxial extruder to produce covered lead wires for vehicles, of 1.3 mm in outer diameter and 0.2 mm in thickness of the cover which is an insulating material.

The resulting covered lead wires for vehicles were tested and evaluated for the abrasion resistance, scrape resistance and extrusion processability according to the following methods. Results obtained are shown in Table 2.

(1) Abrasion resistance:

Observed with use of a Tavor's rotary abrasion tester under the conditions of an abrasion wheel CS-17, a load of 1000 g, test temperature of 20° C. and test humidity of 60%.

A: Abrasion index, less than 25
B: not less than 25 and less than 50
C: not less than 50

(2) Scrape resistance:

A covered lead wire for vehicles, of 120 mm in length was stretched and fixed at its both ends, and a blade of 4 mm in thickness and B20 degrees of angle at its edge portion, and having a rounded edge with a curvature of 0.15 R was pressed against the above stretched covered lead wire under a load of 1,000 kg. Under this state, the blade was reciprocated with a stroke of 10 mm in the rate of once per second. Measured was the reciprocating number of times counted until the blade broke the cover and was electrified through the copper wire.

A: Not less than 100 times
B: Not less than 60 times and less than 100 times
C: Less than 60 times (3) Extrusion processability:

A: Stable in the extrusion processability, and good in the surface state.
B: Poorly stable in the extrusion processability, and infeasible for forming works in the long run or inferior in the surface state.
C: No covered lead wire for vehicles can be formed at all.

TABLE 1

|  | Examples ||||| Comparative Examples |||||
|---|---|---|---|---|---|---|---|---|---|---|
|  | 1 | 2 | 3 | 4 | 5 | 1 | 2 | 3 | 4 | 5 |
| Polyvinyl chloride ($\bar{p}$ = 3,800) | 100 | 100 |  |  | 100 | 100 | 100 |  |  | 100 |
| Polyvinyl chloride ($\bar{p}$ = 2,500) |  |  |  | 100 |  |  |  | 100 |  |  |
| Polyvinyl chloride |  |  | 100 |  |  |  |  |  | 100 |  |

TABLE 1-continued

|  | Examples | | | | | Comparative Examples | | | | |
|---|---|---|---|---|---|---|---|---|---|---|
|  | 1 | 2 | 3 | 4 | 5 | 1 | 2 | 3 | 4 | 5 |
| (p̄ = 1,700) | | | | | | | | | | |
| Trioctyl trimellitate | 40 | 60 |  | 70 | 50 | 20 |  | 50 | 65 |  |
| Tricresyl phosphate |  |  | 40 |  |  |  | 40 |  |  | 50 |
| Polydimethylsiloxane (500 cSt) | 1 |  |  |  |  |  |  |  |  |  |
| Polymethylphenylsiloxane (500 cSt) |  | 0.5 |  | 2 |  |  | 0.05 |  |  |  |
| Polymethylphenylsiloxane (5,000 cSt) |  |  | 3 |  | 7 | 5 |  | 15 | 3 | 2 |
| Tribasic lead sulfate | 2 |  | 2 | 2 | 2 | 2 | 2 |  | 0.7 |  |
| Barium stearate | 1 |  | 1 | 1 | 1 | 1 | 1 |  |  |  |
| Lead stearate | 0.5 |  | 0.5 | 0.5 | 0.5 | 0.5 | 0.5 |  |  |  |
| RUP14 (Adeka Argus)[1] |  | 1.5 |  |  |  |  |  | 2 |  | 0.7 |
| AC186 (Adeka Argus)[2] |  | 0.5 |  |  |  |  | 1 |  |  |  |
| Epoxidized soybean oil |  | 2 |  |  |  |  |  | 3 |  |  |
| Calcined clay |  | 3 |  |  | 2 | 2 |  |  | 2 | 2 |
| Ground whiting |  |  |  | 2 |  |  |  |  |  |  |
| Micrex C-8728[3] |  |  | 1 | 1 | 1 | 1 | 1 |  | 1 |  |
| Metablen P 501[4] |  |  |  |  | 1 | 1 |  | 1 |  | 1 |

Remarks
[1]RUP14: Powdery Ba—Zn stabilizer (Adeka Argus)
[2]AC186: Liquid Ba—Zn stabilizer (Adeka Argus)
[3]Micrex C-8728: Pigment (black) (available from Dainichiseika Color & Chemicals Mfg. Co., Ltd.)
[4]Metablen P 501: Acrylic modifier (available from Mitsubishi Rayon Co., Ltd.)

TABLE 2

| Properties | Examples | | | | | Comparative Examples | | | | |
|---|---|---|---|---|---|---|---|---|---|---|
|  | 1 | 2 | 3 | 4 | 5 | 1 | 2 | 3 | 4 | 5 |
| Abrasion resistance | A | A | B | A | A | A | C | A | A | A |
| Scrape resistance | A | A | B | A | A | A | C | C | B | A |
| Processability | A | A | A | A | A | C | A | C | C | C |

What is claimed is:

1. A covered lead wire for vehicles, having a cover with improved abrasion and scrape resistance, said cover being formed of a composition consisting essentially of;
   (A) 100 parts by weight of polyvinyl chloride resin;
   (B) 0.1 part to 10 parts by weight of a polyorganosiloxane selected from the group consisting of polydimethylsiloxanes and polymethylphenylsiloxanes, having a viscosity of 10,000 cSt or less at 25° C.;
   (C) at least 30 parts by weight of a plasticizer; and
   (D) at least 1 part by weight of a stabilizer,
   wherein said cover is 0.1 to 0.5 mm in thickness.

2. The covered lead wire for vehicles according to claim 1, wherein said polyvinyl chloride resin has an average polymerization degree of 2,000 to 4,000.

3. The covered lead wire for vehicles according to claim 1, wherein 50 to 100% by weight of said polyvinyl chloride resin is partially crosslinked polyvinyl chloride resin.

4. The covered lead wire for vehicles according to claim 1, wherein said polyorganosiloxane is a polymethylphenylsiloxane containing 5 to 25 mol % of phenyl groups and having a viscosity of 5,000 to 10,000 cSt at 25° C.

5. The covered lead wire for vehicles according to claim 1, wherein said polydimethylsiloxanes and polymethylphenylsiloxanes are modified with a least one of amino groups, acrylic groups or hyudroxyl groups.

6. The covered lead wire for vehicles according to claim 1, wherein the amount of said component (b) is 0.1 to 3 parts by weight.

7. The covered lead wire for vehicles according to claim 1, wherein the amount of said component (C) is 50 to 150 parts by weight.

8. The covered lead wire for vehicles according to claim 1, wherein said plasticizer (C) is at least one of a phthalic acid ester, a straight-chain dibasic acid ester, a phosphoric acid ester, a trimellitic acid ester or a polyester epoxy compound.

9. The covered lead wire for vehicles according to claim 1, wherein said stabilizer (D) is a lead stabilizer.

10. The covered lead wire for vehicles according to claim 9, wherein said lead stabilizer is lead stearate or tribasic lead phosphate.

* * * * *